M. STEWART.
SHINGLE-MACHINE.
No. 174,447. Patented March 7, 1876.
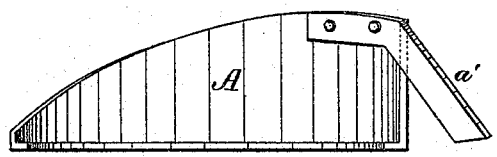
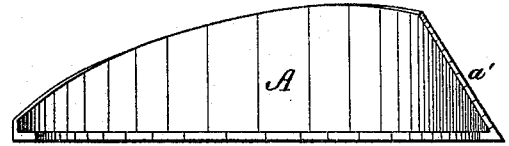
WITNESSES:
W. W. Hollingsworth
A. W. Hart
INVENTOR:
M. Stewart
BY Munn & Co.
ATTORNEYS.

UNITED STATES PATENT OFFICE.

MOSES STEWART, OF DALLAS, TEXAS.

IMPROVEMENT IN SHINGLE-MACHINES.

Specification forming part of Letters Patent No. 174,447, dated March 7, 1876; application filed October 29, 1875.

*To all whom it may concern:*

Be it known that I, MOSES STEWART, of Dallas, in the county of Dallas and State of Texas, have invented a new and useful Improvement in Shingle-Machines, of which the following is a specification:

Figure 1 is a top view of a cone or inclined guide-plate of a shingle-machine to which my improvement has been applied. Fig. 2, a side view of the same. Fig. 3 represents a modified form of the same.

Similar letters of reference indicate corresponding parts.

The object of this invention is to improve the construction of the shingle-machine known as the "Evarts Rotary Twelve-Block Shingle-Machine," in such a way as to prevent the blocks from jumping when the dogs strike them, and thus make the said machines more effective in operation.

The invention consists in the incline formed upon the rear ends of the guide-plates of a shingle-machine for controlling the movements of the dogs that hold the blocks while being sawed, as hereinafter fully described.

The Evarts machine is provided with a cone or curved guide-plate, A, the upper edge of which is inclined to receive the stems formed upon the inner ends of the weighted dogs, and withdraw said dogs from the blocks as the said blocks leave the saws. As the blocks again approach the saws, the stems of the dogs drop from the rear ends of the guide-plates A, and the weight of the dogs as they drop causes them to take hold of the blocks. This sudden blow by the dogs caused the blocks to jump, and very often caused imperfect shingles to be sawed. To remedy this, I form a short incline, $a'$, upon the rear ends of the guide-plates A for the stems of the dogs to slide down upon, so that the dogs may take hold of the blocks gently and without moving them from their place, and the effect of which is to cause the machine to saw perfect shingles.

In the case of old machines, the inclines $a'$ may be formed by attaching an arm or plate to the rear ends of the guide-plates A, as shown in Figs. 1 and 2. In the case of new machines, the inclines $a'$ may be formed as a solid part of the guide-plates A, as shown in Fig. 3.

Having thus described my invention, I claim as new and desire to secure by Letters Patent—

The incline $a'$ formed upon the rear ends of the guide-plates A of a shingle-machine for controlling the movements of the dogs that hold the blocks while being sawed, substantially as herein shown and described.

MOSES STEWART.

Witnesses:
A. R. HIGH,
WM. R. BELL.